US012722830B2

(12) United States Patent
Bononi et al.

(10) Patent No.: US 12,722,830 B2
(45) Date of Patent: Sep. 1, 2026

(54) MULTILAYER ROD, SEALING UNIT, PACKAGE FORMING APPARATUS, PACKAGING MACHINE, METHOD FOR MANUFACTURING A MULTILATER ROD AND METHOD FOR MANUFACTURING AN INDUCTION SEALING DEVICE

(71) Applicant: Tetra Laval Holdings & Finance S.A., Pully (CH)

(72) Inventors: Massimiliano Bononi, Modena (IT); Stefano Fantini, Modena (IT); Richard Sandberg, Lund (SE)

(73) Assignee: Tetra Laval Holdings & Finance S.A., Pully (CH)

(*) Notice: Subject to any disclaimer, the term of this patent is extended or adjusted under 35 U.S.C. 154(b) by 0 days.

(21) Appl. No.: 19/105,069

(22) PCT Filed: Dec. 4, 2023

(86) PCT No.: PCT/EP2023/084056
§ 371 (c)(1),
(2) Date: Feb. 20, 2025

(87) PCT Pub. No.: WO2024/126121
PCT Pub. Date: Jun. 20, 2024

(65) Prior Publication Data

US 2025/0296718 A1 Sep. 25, 2025

(30) Foreign Application Priority Data

Dec. 13, 2022 (IT) ........................ 102022000025503

(51) Int. Cl.
*B65B 1/00* (2006.01)
*B23K 1/00* (2006.01)
(Continued)

(52) U.S. Cl.
CPC .......... *B65B 51/227* (2013.01); *B23K 1/0008* (2013.01); *B23K 1/19* (2013.01);
(Continued)

(58) Field of Classification Search
CPC ..... B65B 51/227; B65B 15/01; B65B 15/017; B65B 15/016; B65B 3/28; B65B 15/015;
(Continued)

(56) References Cited

U.S. PATENT DOCUMENTS 2,802,086 A 8/1957 Fener
2002/0144778 A1 10/2002 Belias et al.
(Continued)

FOREIGN PATENT DOCUMENTS

EP 2984903 A1 2/2016
EP 3620293 A1 3/2020
(Continued)

OTHER PUBLICATIONS

International Search Report mailed Feb. 16, 2024, for International Application No. PCT/EP2023/084056.

*Primary Examiner* — Jacob A Smith
(74) *Attorney, Agent, or Firm* — Renner, Otto, Boisselle & Sklar, LLP

(57) ABSTRACT

There is described a multilayer rod (24) for an induction coil (22,22') of a sealing unit (18) comprising a metal layer (25) and a corrosion-resistant layer (26); the corrosion-resistant layer (26) comprises and/or is formed from a nickel alloy.

15 Claims, 6 Drawing Sheets

(51) Int. Cl.

| | |
|---|---|
| ***B23K 1/19*** | (2006.01) |
| ***B29C 45/14*** | (2006.01) |
| ***B65B 9/20*** | (2012.01) |
| ***B65B 51/22*** | (2006.01) |
| ***B65B 51/26*** | (2006.01) |
| *B23K 101/38* | (2006.01) |
| *B23K 103/08* | (2006.01) |
| *B29L 31/00* | (2006.01) |

(52) U.S. Cl.
CPC .......... *B29C 45/14819* (2013.01); *B65B 9/20* (2013.01); *B65B 51/26* (2013.01); *B23K 2101/38* (2018.08); *B23K 2103/08* (2018.08); *B29L 2031/779* (2013.01)

(58) Field of Classification Search
CPC ............ B65B 2311/12; B65B 2311/22; B23K 1/0008; B23K 1/19; B23K 2103/26; B23K 2103/18; B23K 2103/08; B23K 2103/14; B23K 2103/10; B23K 2101/001; B23K 2103/12; B23K 20/10; B23K 20/16
USPC ...... 53/451; 228/110.1, 112.1, 119, 121, 194
See application file for complete search history.

(56) References Cited

U.S. PATENT DOCUMENTS

| | | | | |
|---|---|---|---|---|
| 2013/0174523 | A1* | 7/2013 | Edwards | B65B 9/2056<br>53/451 |
| 2016/0059480 | A1* | 3/2016 | Bierlein | B29C 66/849<br>29/458 |
| 2018/0211794 | A1* | 7/2018 | Brambilla | H01G 11/14 |
| 2019/0160638 | A1* | 5/2019 | Deleuze | B25B 27/0028 |

FOREIGN PATENT DOCUMENTS

| | | | |
|---|---|---|---|
| EP | 3936314 | A1 | 1/2022 |
| JP | H10321361 | A | 12/1998 |

* cited by examiner 22
26
25a
25
26a
24

35a
35b
34a
34b
34d
22'
36
30b
30a
30

MULTILAYER ROD, SEALING UNIT, PACKAGE FORMING APPARATUS, PACKAGING MACHINE, METHOD FOR MANUFACTURING A MULTILATER ROD AND METHOD FOR MANUFACTURING AN INDUCTION SEALING DEVICE

TECHNICAL FIELD

The present invention relates to a multilayer rod for an induction coil, preferentially of a sealing unit for sealing a multilayer packaging material.

Advantageously, the present invention also relates to a sealing unit for a package forming apparatus for sealing a tube formed from a multilayer packaging material for packages filled with a pourable product, preferentially a pourable food product.

Advantageously, the present invention also relates to a package forming apparatus for a packaging machine for forming packages filled with a pourable product, preferentially a pourable food product.

Advantageously, the present invention also relates to a packaging machine for forming packages filled with a pourable product, preferentially a pourable food product.

Advantageously, the present invention also relates to a method for manufacturing a multilayer rod for an induction coil of a sealing unit for sealing a multilayer packaging material.

Advantageously, the present invention also relates to a method for manufacturing an induction sealing device comprising an induction coil comprising and/or formed from a multilayer rod.

BACKGROUND ART

As it is known, many liquid or pourable food products, such as fruit juice, UHT (ultra-high-temperature treated) drinks, milk, wine, tomato sauce, etc., are sold in packages made of a paper- or carton-based packaging material. A typical example of this type of packages is the parallelepiped-shaped package known as Tetra Brik Aseptic®, which is made by folding and sealing a web of laminated packaging material.

The packaging material has a multilayer structure substantially comprising a base layer of fibrous material, e.g., paper or carton, covered on both sides with layers of heat-sealable polymeric material, e.g., polyethylene. In the case of aseptic packages for long-storage products, such as UHT milk, and for which storage and distribution are made in ambient temperature, the packaging material also typically comprises a layer of gas- and light-barrier material, e.g., aluminium foil, which is superimposed on a layer of heat-sealable polymeric material, and is in turn covered with another layer of heat-sealable polymeric material forming the inner face of the package eventually contacting the food product.

Packages formed from the aforedescribed multilayer packaging material are normally produced in fully automatic packaging machines such as the Tetra Pak® A3/Flex filling machine, which applies the form-fill-seal technology. More specifically, the production process of this type of packages involves advancing a web of packaging material through a sterilisation unit for sterilising the web of packaging material at a sterilisation station and to an isolation chamber, enclosing a sterile environment, in which the sterilised web of packaging material is maintained and advanced. During its advancement through the closed and sterile chamber, the web of packaging material is folded and sealed longitudinally at a tube forming station to form a tube. The resulting tube is fed continuously along an advancing direction, is filled with a sterilised or sterile-processed pourable product, in particular a pourable food product, and is gripped at equally spaced cross sections by respective operative groups of a packaging forming apparatus. More specifically, the operative groups act cyclically and successively on the tube, and heat seal the packaging material of the tube to form cushion-shaped packages connected to one another by respective transversal sealing bands, extending in a transversal direction to the advancing direction. The cushion-shaped packages are separated by transversally cutting the respective sealing bands. The packages are then conveyed to a final folding station where they are folded mechanically into the finished parallelepiped shape.

Conventionally, the packages are heat sealed via an ultrasonic welding process or an induction heating process. In the packaging machines using induction heat sealing, each operative group comprises a sealing unit comprising a sealing unit having an induction sealing device substantially comprising an induction coil powered by a high-frequency current generator. More specifically, the induction coil is made of a conductive material and the generated electromagnetic field interacts with the layer of aluminium foil in the packaging material to induce eddy currents and heat the polymeric material to the necessary sealing temperature.

A known induction sealing device is disclosed in patent document EP2984903A1 and comprises an induction coil made from a multilayer rod composed of a conductive layer made of pure silver and a corrosion-resistant layer made of a silver-palladium alloy. In particular, the induction coil has one or more sealing surfaces defined by at least a section of the corrosion-resistant layer and is partially encapsulated in a supporting body in order that the sealing surfaces are exposed externally from a supporting body of the induction sealing device, for cooperation with the tube during the formation of packages.

Even though the known induction sealing devices work satisfactorily well, the use of a silver-palladium alloy for manufacturing the corrosion-resistant layer of the multilayer rod comes along with significant costs.

DISCLOSURE OF INVENTION

It is therefore an object of the present invention to provide a multilayer rod for an induction coil of a sealing unit comprising a corrosion-resistant layer coming along with reduced costs.

Advantageously, it is another object of the present invention to provide an improved sealing unit for a package forming apparatus.

Advantageously, it is another object of the present invention to provide an improved package forming apparatus for a packaging machine.

Advantageously, it is another object of the present invention to provide an improved packaging machine.

Advantageously, it is another object of the present invention to provide a method for manufacturing a multilayer rod for an induction coil of a sealing unit and comprising a corrosion-resistant layer coming along with reduced costs.

Advantageously, it is another object of the present invention to provide a method for manufacturing an induction sealing device having an induction coil comprising and/or formed from a multilayer rod for an induction coil and comprising a corrosion-resistant layer.

According to the present invention, there is provided a multilayer rod as claimed in claim 1.

Preferred non-limiting embodiments of the multilayer rod are claimed in the claims being directly and indirectly dependent on claim 1.

According to the present invention, there is also provided a sealing unit according to claim 9.

Preferred non-limiting embodiments of the sealing unit are claimed in the claims being directly and indirectly dependent on claim 9.

According to the present invention, there is also provided a packaging forming apparatus according to claim 12.

According to the present invention, there is also provided a packaging machine according to claim 13.

According to the present invention, there is also provided a method for manufacturing a multilayer rod according to claim 14.

According to the present invention, there is also provided a method for manufacturing an induction sealing device according to claim 15.

BRIEF DESCRIPTION OF THE DRAWINGS

Two non-limiting embodiments of the present invention will be described by way of example with reference to the accompanying drawings, in which.

BEST MODES FOR CARRYING OUT THE INVENTION

Figure 1:
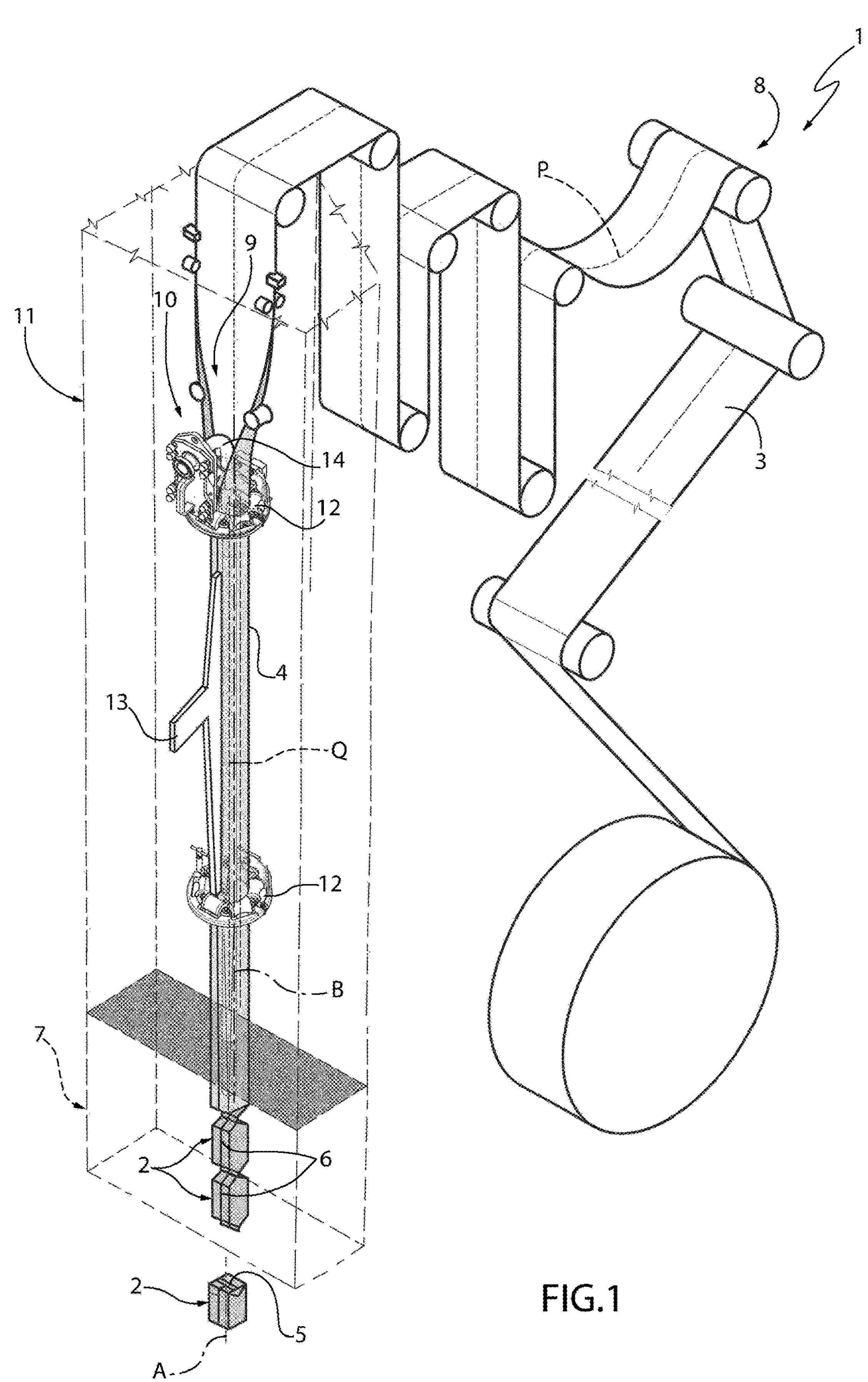
FIG. 1 is a schematic view of a packaging machine for the formation of packages and having a package forming apparatus, with parts removed for clarity.

Number 1 indicates as a whole a packaging machine for producing sealed packages 2 of a pourable product, in particular a pourable food product, such as milk, milk drinks, yoghurt, yoghurt drinks, fruit juice, wine, tomato sauce, emulsions, beverages containing pulp, salt, sugar, and so on.

In more detail, packaging machine 1 may be configured to produce packages 2 from a multilayer packaging material, preferentially having heat seal properties (i.e., portions of the multilayer packaging material can be sealed to one another using heat and advantageously also pressure).

In further detail, the multilayer packaging material may comprise at least two layers of heat-seal polymeric material, e.g., polyethylene, and at least one layer of fibrous material, such as, e.g., paper or cardboard, interposed between the at least two layers of heat-seal polymeric material. Preferentially, one of the layers of heat-seal polymeric material may have a face defining the inner face of packages 2 being at least partially in contact with the pourable product.

Furthermore, the multilayer packaging material may also comprise a layer of gas- and light-barrier material comprising and/or consisting of a metallic material, preferentially arranged between one of the layers of heat-seal polymeric material and the layer of fibrous material. Preferentially, the layer of gas- and light-barrier material may comprise an aluminium foil.

Preferentially, the multilayer packaging material may comprise a metallic layer susceptible to induction heating. More preferentially, the metallic layer may also act as the layer of gas- and light-barrier material.

Most preferentially, the metallic layer may be an aluminium layer.

Preferentially, the packaging material may also comprise a further layer of heat-seal polymeric material placed between the layer of gas- and light-barrier material and the layer of fibrous material.

Moreover, the multilayer packaging material may be provided in the form of a web 3.

In particular, packaging machine 1 may be configured to produce packages 2 by forming a tube 4 from web 3, longitudinally sealing tube 4, filling tube 4 with the pourable product and transversally sealing and cutting tube 4.

According to some possible non-limiting embodiments, each package 2 may extend along a longitudinal axis A.

According to some possible embodiments, each package 2 may comprise at least a first transversal sealing band 5 and preferentially also a second transversal sealing band arranged at opposite ends of package 2, and preferentially extending in a transversal direction to axis A.

Preferentially, first transversal sealing band 5 of each package 2 may define an upper transversal sealing band and the respective second transversal sealing band may define a lower transversal sealing band.

Moreover, each package 2 may also comprise a longitudinally extending seam portion 6. Preferentially, each first sealing band 5 and/or each second sealing band may be transversal, preferentially perpendicular, to the respective seam portion 6.

With particular reference to FIG. 1, packaging machine 1 may comprise a package forming apparatus 7 configured to transversally seal tube 4 for obtaining packages 2. Preferentially, package forming apparatus 7 may also be configured to transversally cut and to at least partially form tube 4.

Furthermore, packaging machine 1 may also comprise:

- a conveying device 8 configured to advance web 3 along a web advancement path P, preferentially to a tube forming station where web 3 is formed into tube 4, and configured to advance tube 4 along a tube advancement path Q;
- a tube forming and sealing device 9 configured to fold the advancing web 3 into tube 4 and longitudinally seal tube 4; and
- a filling device 10 for filling tube 4 with the pourable product.

Packaging machine 1 may further comprise an isolation chamber 11, preferentially enclosing a sterile environment. Preferentially, the sterile environment may contain a controlled atmosphere.

Preferentially, tube forming and sealing device 9 may be at least partially arranged within isolation chamber 11 and be configured to fold and longitudinally seal tube 4 within isolation chamber 11.

Moreover, packaging machine 1 may also comprise a sterilising unit (not shown) configured to sterilise the advancing web 3; preferentially, the sterilisation unit may be arranged upstream of tube forming and sealing device 9 along web advancement path P.

In further detail, conveying device 8 may be configured to advance tube 4 and any partially formed tube 4 along a tube advancement path Q, preferentially from tube forming and sealing device 9 to package forming apparatus 7.

As used herein, the expression "partially formed tube" is intended to mean any configuration of web 3 obtained between the commencement of the process of folding web 3 performed by tube forming and sealing device 9 and the formation of the structure of tube 4. In other words, partially formed tube 4 is the result of the gradual folding of web 3 so as to obtain tube 4, preferentially by overlapping the longitudinal edges of web 3 with one another.

According to some possible non-limiting embodiments, tube forming and sealing device 9 may be arranged such that tube 4 has a vertical orientation. Preferentially, tube 4 may extend along a longitudinal axis B parallel to axis A.

Moreover, tube forming and sealing device 9 may comprise at least two forming ring assemblies 12, preferentially arranged within isolation chamber 11, configured to cooperatively and gradually fold web 3 into tube 4, preferentially by overlapping the edges of web 3 with one another, thereby forming seam portion 6.

Furthermore, tube forming and sealing device 9 may also comprise a sealing head 13, preferentially arranged within isolation chamber 11, configured to longitudinally seal tube 4, preferentially along seam portion 6.

In addition, tube forming and sealing device 9 may also comprise a pressure assembly configured to exert a mechanical force on seam portion 6 in order that tube 4 is securely sealed along seam portion 6.

Preferentially, filling device 10 may comprise a filling pipe 14 configured to direct the pourable product into tube 4. Preferentially, filling pipe 14 may be at least partially placed within tube 4 whilst it feeds the pourable product into tube 4.

Figure 2:
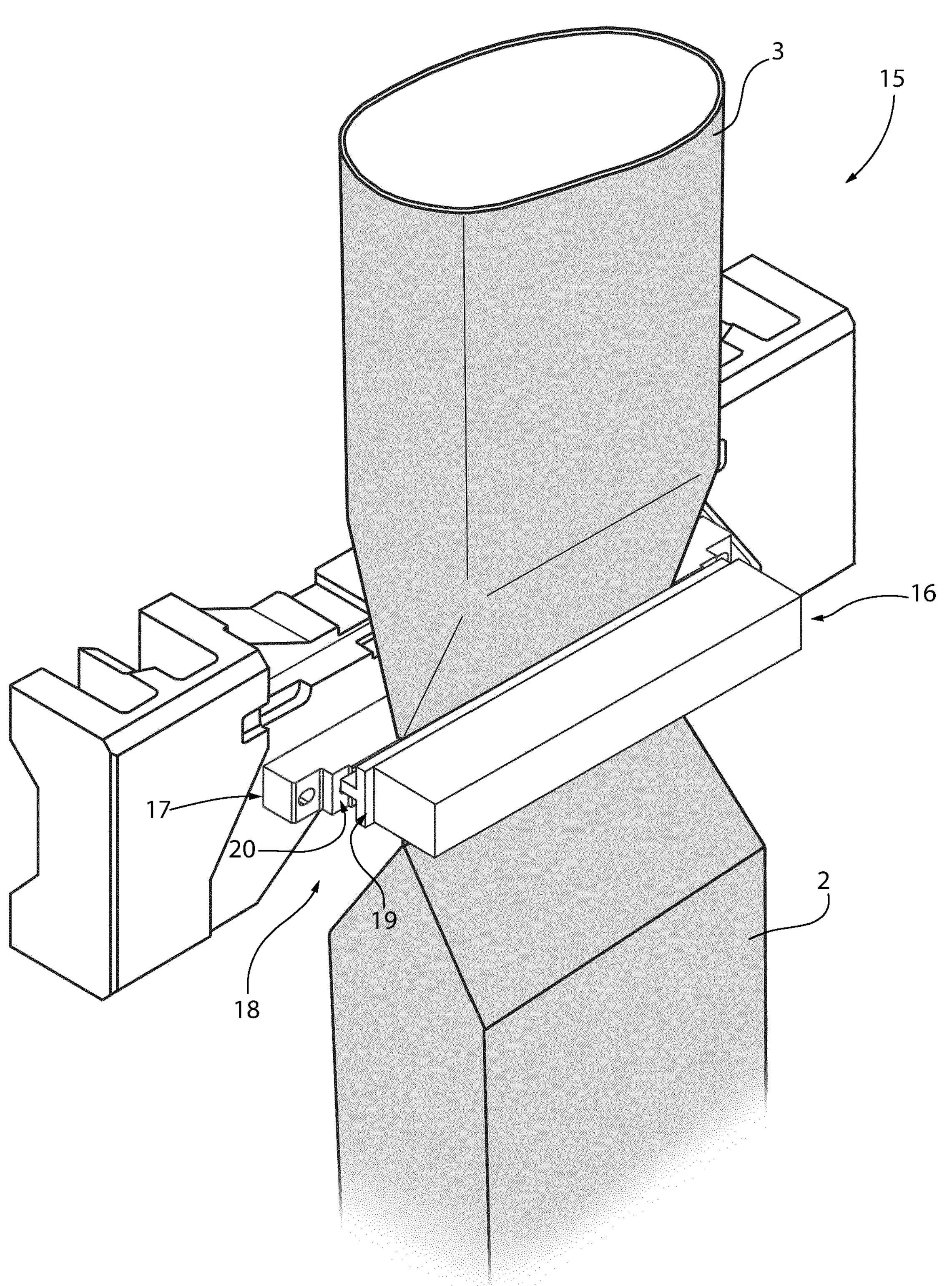
FIG. 2 is a schematic perspective view of a detail of the package forming apparatus of FIG. 1, with parts removed for clarity.

With particular reference to FIGS. 1 and 2, package forming apparatus 7 may comprise at least one or preferentially a plurality of operative assemblies 15 (only partially shown in FIG. 2 to the extent necessary to comprehend the present invention), each one configured to transversally seal tube 4. Preferentially, each operative assembly 15 may also be configured to transversally cut and to at least partially form tube 4.

Package forming apparatus 7 may further comprise a conveying unit 8 configured to advance operative assemblies 15. Preferentially, package forming apparatus 7 may be configured to control operative assemblies 15 and the conveying unit so as to transversally seal and preferentially cut tube 4 along equally spaced transversal cross sections, thereby forming the respective first transversal sealing bands 5 and/or the respective transversal second sealing bands.

In further detail and with particular reference to FIG. 2, each operative assembly 15 may comprise at least a first operative group 16 and a second operative group 17 configured to cooperate with one another so as to at least transversally seal and preferably cut and at least partially form tube 4.

According to some preferred non-limiting embodiments, the conveying unit may be configured to advance first operative group 16 along a first advancement path and second operative group 17 along a second advancement path.

Moreover, each first operative group 16 and the respective second operative group 17 may be configured to cooperate with one another to form a package 2 when advancing along a respective operative section of their respective first advancement path and the second advancement path, respectively.

In addition, each one of the first advancement path and the second advancement path may also comprise a respective return section, which allows the return of first operative group 16 and second operative group 17 back to the respective operative section.

Moreover, each operative assembly 15 comprises at least one sealing unit 18 configured to transversally seal tube 4, thereby preferentially forming a respective main sealing band extending in a transversal direction to axis B.

Preferentially, each operative assembly 15 further comprises at least one cutting unit (not shown) configured to transversally cut tube 4.

In particular, each cutting unit may be configured to transversally cut tube 4 after the latter is sealed by the respective sealing unit 18.

Even more preferentially, each cutting unit may be configured to cut the respective main sealing band, thereby preferentially forming a respective first transversal sealing band 5 and a respective second transversal sealing band. In other words, each main sealing band comprises a first transversal sealing band 5 and a second transversal sealing band. More in specific, each transversal main sealing band may comprise a first transversal sealing band 5 of a first package 2 and a second transversal sealing band of a second package 2, the second package 2 being arranged downstream of the first package 2 along tube advancement path Q.

In further detail, each sealing unit 18 may comprise an induction sealing device 19 configured to generate an electromagnetic field, preferentially configured to interact and/or heat the metallic layer.

Moreover, each sealing unit 18 may comprise a counter-sealing element 20 configured to cooperatively seal tube 4 with the respective induction sealing device 19.

Preferentially, each induction sealing device 19 and the respective counter-sealing element 20 may be configured to create the respective main sealing band. More specifically, each induction sealing device 19 and the respective counter-sealing element 20 may be configured to engage tube 4 from opposite sides thereof.

Preferentially, first operative groups 16 may comprise the respective induction sealing device 19 and the respective second operative groups 17 may comprise the respective counter-sealing elements 20.

In more detail, each induction sealing device 19 and the respective counter-sealing element 20 may be configured to at least transversally compress and transversally seal tube 4 when tube 4 is advancing along tube advancement path Q and a portion thereof is placed between a partially sealed package 2 and a package 2. As used herein, the expression "partially sealed package" is intended to mean any configuration of package 2 while being still part of tube 4 and having the already formed first transversal sealing band 5.

Figures 3, 5:
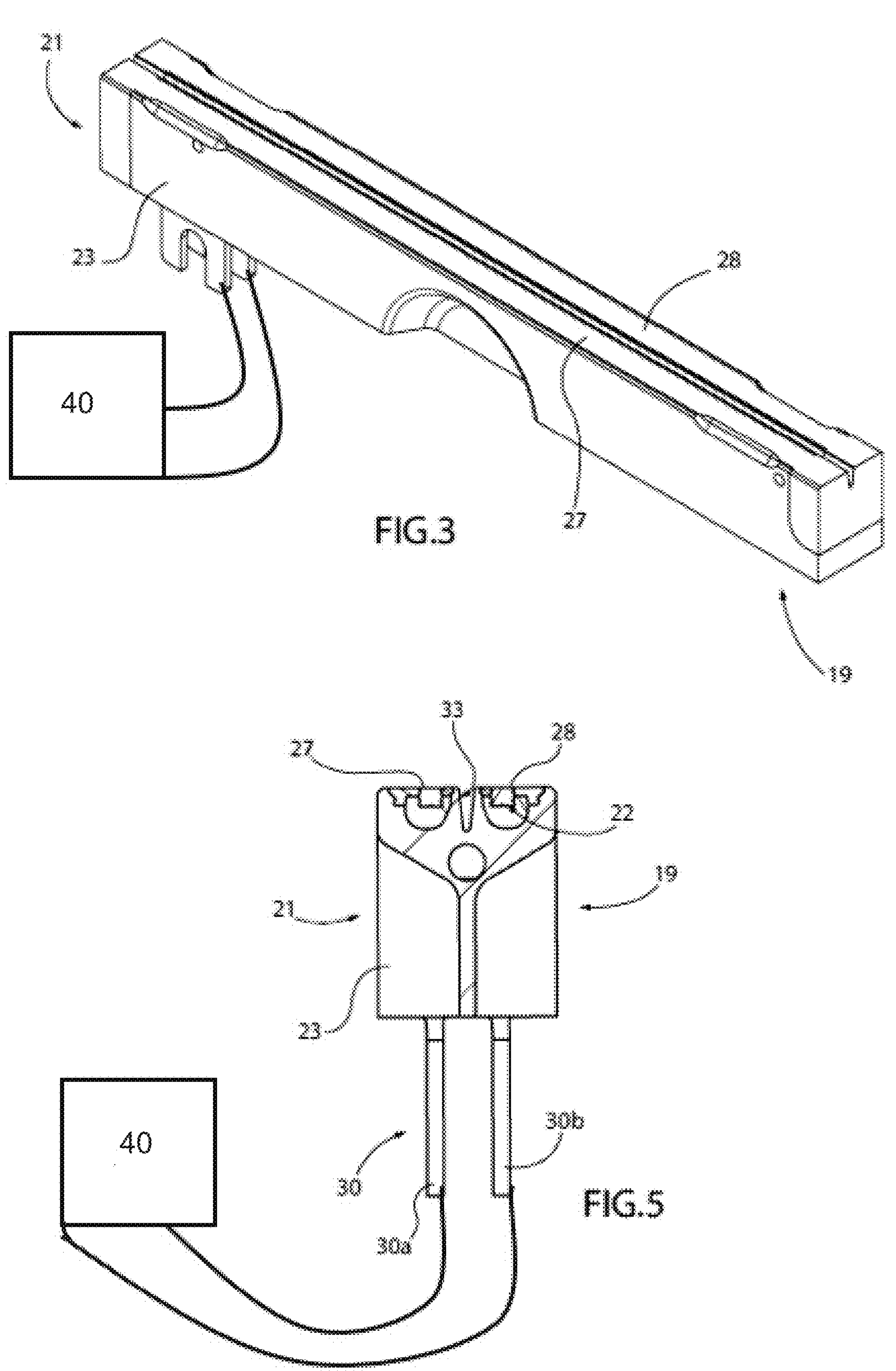
FIG. 3 is a perspective view of an induction sealing device of the package forming apparatus according to a first embodiment of the present invention.
FIG. 5 is a section view of the induction sealing device of FIG. 3.
Figure 4:
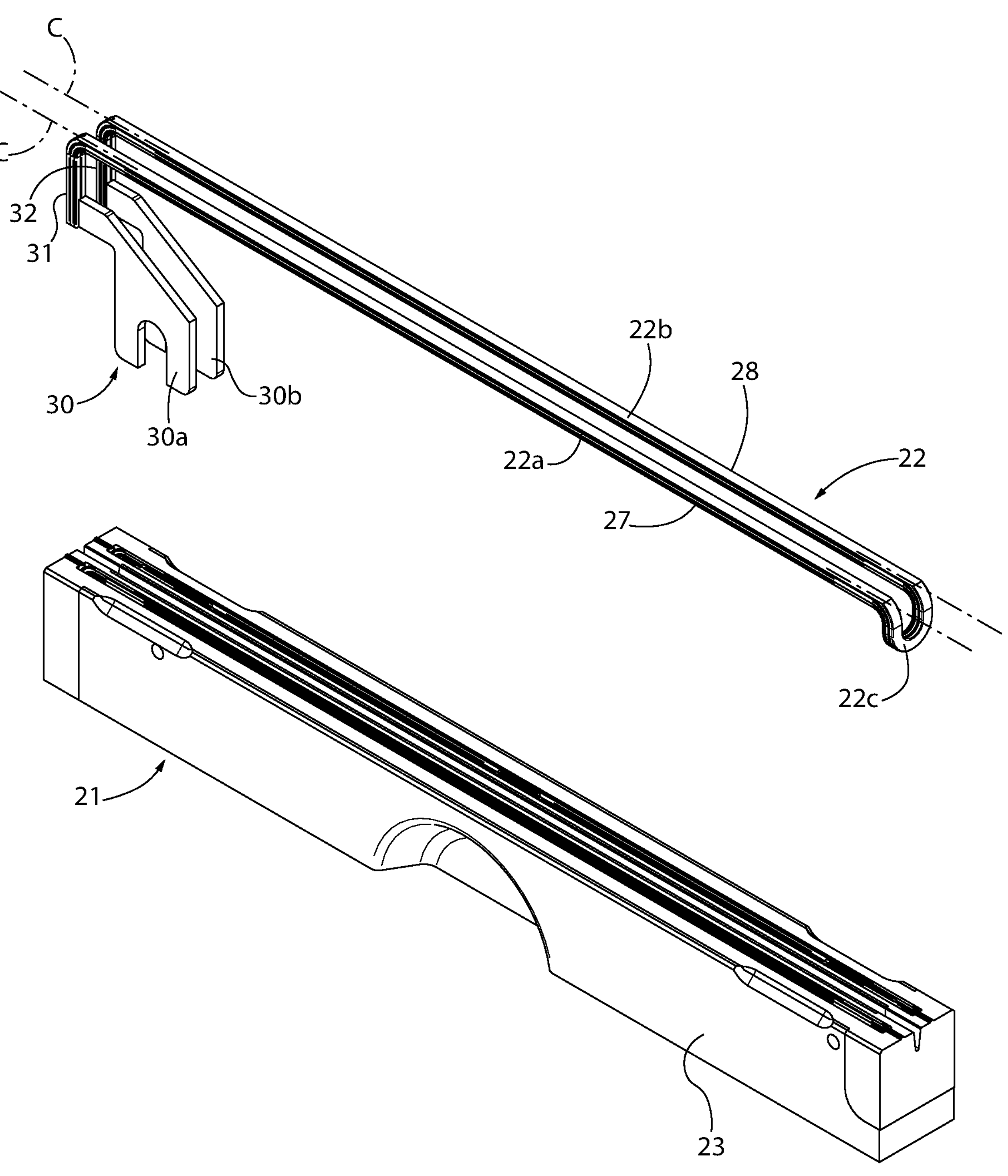
FIG. 4 is a perspective and partially exploded view of the induction sealing device of FIG. 3, with parts removed for clarity.

As illustrated in FIGS. 3 to 5, each induction sealing device 19 comprises an induction coil 22 configured to generate the electromagnetic field, preferentially for heating by induction the metallic layer, even more preferentially for inducing an alternating current in the metallic layer of the multilayer packaging material. Preferably, each induction sealing device 19 comprises a housing 21, and induction coil 22 is at least partially arranged within and/or encapsulated in housing 21.

Preferentially, housing 21 may comprise at least one main encapsulating portion 23 formed from a polymer, induction coil 22 being at least partially arranged within and/or encapsulated in main encapsulating portion 23.

According to some preferred non-limiting embodiments of the present invention, induction coil 22 comprises and/or is formed from a multilayer rod 24.

Figures 6, 8:
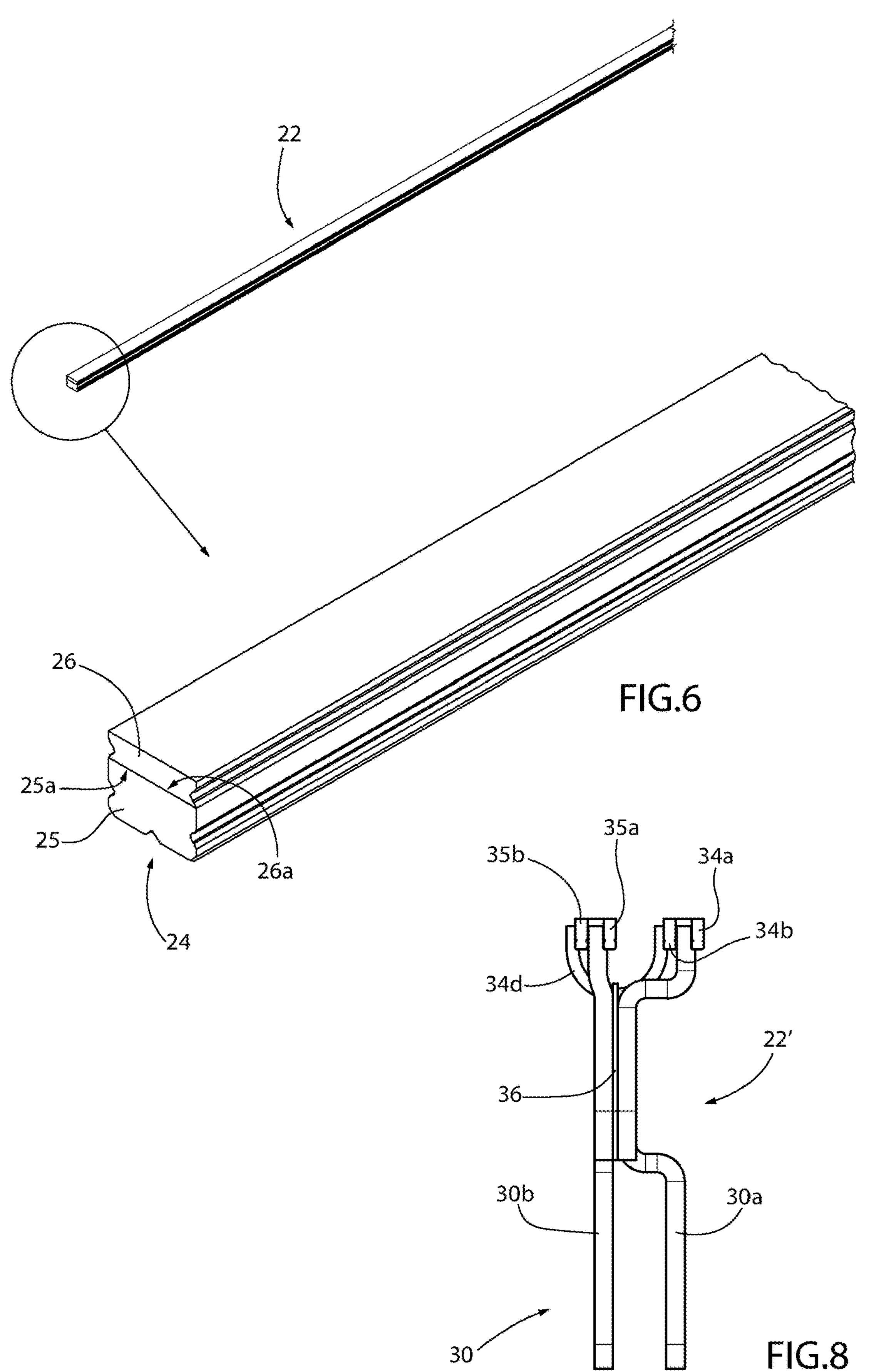
FIG. 6 shows a perspective view of a detail of the induction sealing device of FIG. 3 and an enlarged view of the detail, with parts removed for clarity.
FIG. 8 is a side view of the detail of the induction sealing device shown in FIG. 7.

Advantageously and as illustrated in FIG. 6, multilayer rod 24 comprises and/or consists of a metal layer 25 and a corrosion-resistant layer 26. Preferentially, metal layer 25 may comprise and/or may consist of silver.

In more detail, the respective metal layer 25 of each induction coil 22 serves to generate the electromagnetic field needed for the induction heating process. On the other hand, the respective corrosion-resistant layer 26 acts as a protective layer allowing the positioning of portions of induction coil 22 in a corrosive environment, in particular an environment which would corrode metal layer 25.

In further detail, corrosion-resistant layer 26 may comprise a connecting surface 26*a* arranged on an attachment surface 25*a* of metal layer 25. Preferentially, attachment surface 25*a* and connecting surface 26*b* may be in direct contact with one another.

According to some preferred non-limiting embodiments of the present invention, attachment surface 25*a* and connecting surface 26*a* may be brazed to one another.

According to some preferred non-limiting embodiments of the present invention, corrosion-resistant layer 26 may be composed of a nickel alloy. Advantageously, the nickel alloy may be a nickel-molybdenum-chromium alloy; or in other words, corrosion-resistant layer 26 may comprise a nickel-molybdenum-chromium alloy.

In more detail, the corrosion-resistant layer 26, preferentially the nickel alloy, more preferentially the nickel-molybdenum-chromium alloy, may comprise at least 40% by weight of nickel and/or less than 60% by weight of nickel. In particular, the nickel alloy (or nickel-molybdenum-chromium alloy) may comprise at least 45% by weight of nickel and/or less than 55% by weight of nickel.

The nickel alloy, preferentially the nickel-molybdenum-chromium alloy, may further comprise at least 10% by weight of molybdenum and/or less than 20% by weight of molybdenum. In particular, the nickel alloy (or nickel-molybdenum-chromium alloy) may comprise at least 15% by weight of molybdenum and/or less than 17% by weight of molybdenum.

Moreover, the nickel alloy, preferentially the nickel-molybdenum-chromium alloy, may comprise at least 10% by weight of chromium and/or less than 20% by weight of chromium. In particular, the nickel alloy (or nickel-molybdenum-chromium alloy) may comprise at least 14.5% by weight of chromium and/or less than 16.5% by weight of chromium.

According to some possible non-limiting embodiments, the nickel alloy, preferentially the nickel-molybdenum-chromium alloy, may further comprise iron. In particular, the nickel alloy, preferentially the nickel-molybdenum-chromium alloy, may comprise at least 2% by weight of iron and/or less than 8% by weight of iron, preferentially at least 4% by weight of iron and/or less than 7% by weight of iron.

According to some possible non-limiting embodiments, the nickel alloy, preferentially the nickel-molybdenum-chromium alloy, may also comprise tungsten. In particular, the nickel alloy, preferentially the nickel-molybdenum-chromium alloy, may comprise at least at least 2% and less than 8% by weight of tungsten, preferentially at least 3.0% by weight of tungsten and/or less than 4.5% by weight of tungsten.

Furthermore, the nickel alloy, preferentially the nickel-molybdenum-chromium alloy, may comprise traces (low amounts, i.e., less than 5% by weight, preferably less than 2% or 1% by weight) of additional elements. Preferentially, such elements may be chosen from the list comprising carbon, manganese, phosphorus, silicon, copper, sulfur, vanadium. In particular, the nickel alloy may comprise one or more of the following traces of additional elements:

less than 0.01% of carbon;
less than 1% of manganese;
less than 0.04% of phosphorus;
less than 0.08% of silicon;
less than 2.5% of copper;
less than 0.03% of sulfur;
less than 0.35% of vanadium.

With particular reference to FIGS. 3 and 4, induction coil 22 may preferentially comprise a first induction bar 22*a* and a second induction bar 22*b*, both preferentially extending at least partially rectilinearly and parallel to each other along a respective longitudinal axis C.

More preferentially and as illustrated in FIG. 4, induction coil 22 may also comprise a curved portion 22*c* connecting first induction bar 22*a* and second induction bar 22*b* to one another.

Preferentially, induction coil 22 may further comprise at least a first outer portion 27, and preferentially a second outer portion 28 spaced apart and both protruding away from housing 21, as illustrated in FIG. 5. More specifically, first outer portion 27 and second outer portion 28 may be parallel to one another.

More preferentially, first outer portion 27 and second outer portion 28 may at least partially define and/or comprise a respective outer surface of induction sealing device 19 and/or sealing unit 18. Even more preferentially, first induction bar 22*a* may comprise first outer portion 27 and second induction bar 22*b* may comprise second outer portion 28.

In further detail, first outer portion 27 and second outer portion 25 may be defined by a respective section of corrosion-resistant layer 26 and may be configured to be exposed to an external corrosive environment. In more detail, induction coil 22 may be arranged within and/or encapsulated in housing 21, preferentially within/in main encapsulating portion 23, in such a manner that metal layer 25 may be completely enclosed within housing 21 and covered by corrosion-resistant layer 26.

Moreover, metal layer 25 may advantageously not come into contact with the external corrosive environment. In other words, corrosion-resistant layer 26 of each induction coil 22 serves to protect the respective metal layer 25, which has the necessary electrical conductivity properties for allowing the generation of the electromagnetic field.

Moreover, each induction coil 22 may comprise a connection group 30 configured to connect induction coil 22 to a powering group 40 of package forming apparatus 7, preferentially of the respective sealing unit 18, the powering group 40 being configured to apply an alternating current to the respective induction coil 22.

Preferentially, connection group 30 may comprise a first connection element 30*a* and a second connection element 30*b*, which may be connected to and/or coupled to a first end 31 and a second end 32 of induction coil 22, respectively.

In more detail, connection element 30*a* and second connection element 30*b* may be connected to and/or coupled to first induction bar 22*a* and second induction bar 22*b*, respectively, as illustrated in FIG. 4.

According to some preferred non-limiting embodiments of the present invention, each induction sealing device 19 may comprise at least a groove 33 configured to preferentially receive a cutting element (not shown) of the cutting unit, more preferentially a cutting edge (not shown) of the cutting element.

Preferentially and as illustrated in FIGS. 3 to 5, housing 21 may comprise the respective groove 33.

In more detail, groove 33 may be provided between first induction bar 22*a* and second induction bar 22*b*.

In use, packaging machine 1 produces packages 2 filled with the pourable product.

In more detail, conveying device 8 advances web 3 along web advancement path P to the forming station where tube forming and sealing device 9 forms tube 4 from the advancing web 3 and longitudinally seals tube 4. Filling device 10 then fills tube 4 with the pourable product and package forming apparatus 7 at least partially forms, transversally seals and transversally cuts tube 4 so as to obtain packages 2. It is noted that transversal sealing is performed along a direction transversal to axis B.

In further detail, when package forming apparatus 7 is operating, operative assemblies 15 transversally seal and cut tube 4, preferentially through the respective main sealing band, so as to obtain respective filled packages 2. Preferentially and additionally, operative assemblies 15 at least partially form tube 4.

In more detail, during the transversal sealing operation, induction sealing device 19 generates an electromagnetic field, which interacts with the metallic thereby heating the metallic layer, which again allows to fuse layers of polymeric material with one another.

In more detail, the electromagnetic field is controlled by powering, preferentially by means of the powering unit, induction coil 22.

Figure 7:
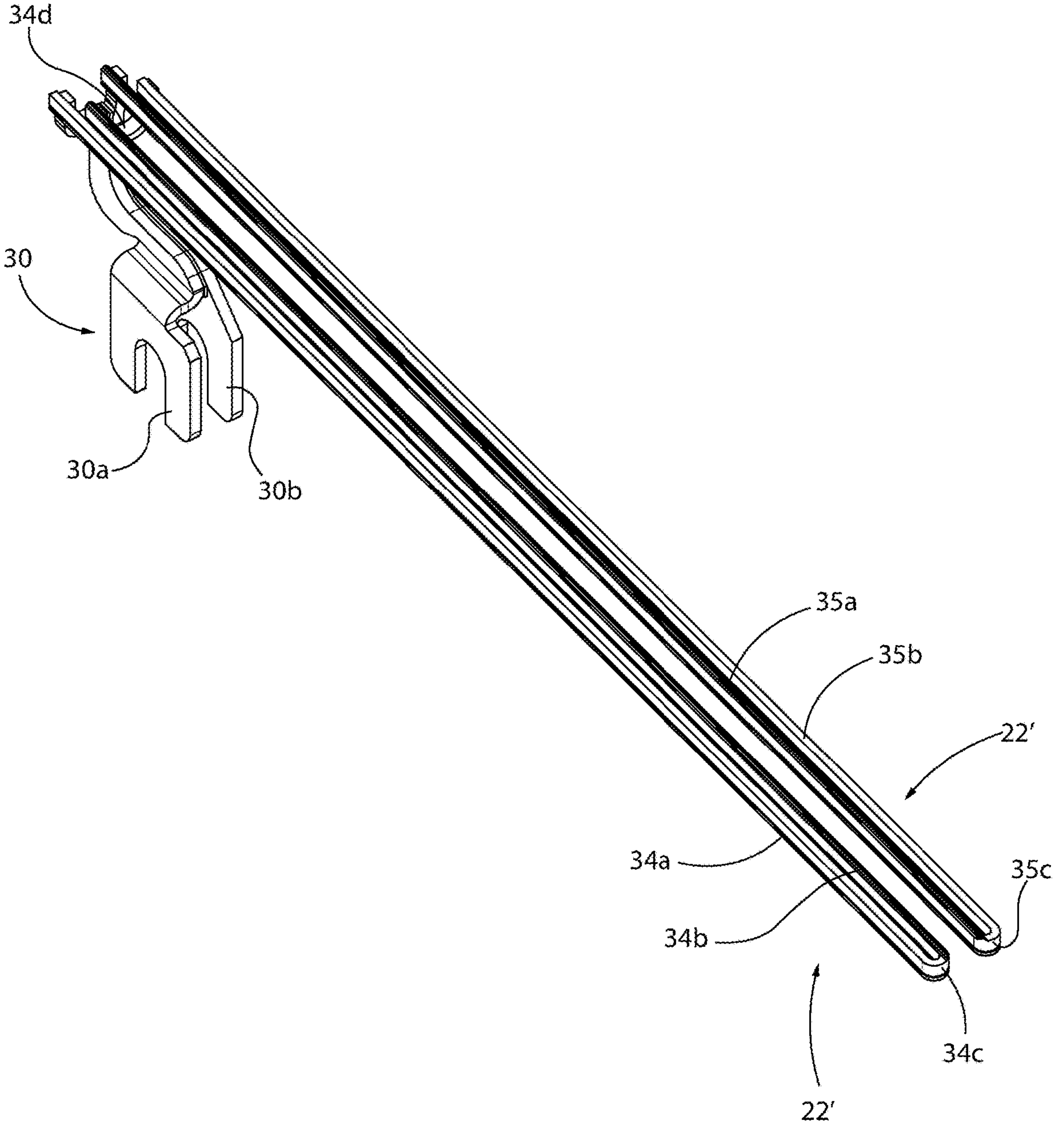
FIG. 7 is a perspective view of a detail of an induction sealing device according to a second embodiment of the present invention.

With reference to FIGS. 7 and 8, number 22' indicates an alternative embodiment of an induction coil according to the present invention; as induction coil 22' is similar to induction coil 22, the following description is limited to the differences between them, and using the same references, where possible, for identical or corresponding parts.

In particular, induction coil 22' may comprise a first pair of induction bars 34*a*, 34*b* and a second pair of induction bars 35*a*, 35*b*.

In more detail, the first and second pairs of induction bars 34*a*, 34*b*, 35*a*, 35*b* may extend rectilinearly and parallel to each other along the respective axis C.

In further detail, induction coil 22' may further comprise a first curved portion 34*c* connecting induction bars 34*a*, 34*b* of the first pair to each other and a second curved portion 35*c* connecting induction bars 35*a*, 35*b* of the second pair to each other.

Furthermore, induction coil 22', preferentially the respective connection group 30, may comprise a third (electrically conductive) curved portion 34*d* connecting induction bars 34*b*, 35*b* of the respective pair to each other.

Moreover, first connection element 30*a* may be connected to and/or coupled to one induction bar of the first pair of induction bars 34*a*, 34*b*, whereas second connection element 30*b* to one induction bar of the second pair of induction bars 35*a*, 35*b*.

As illustrated in the example of FIGS. 7 and 8 of the alternative embodiment of the present invention, first connection element 30*a* is connected to induction bar 34*a* of the first pair of induction bars and second connection element 30*b* is connected to induction bar 35*a* of the second pair of induction bars.

Moreover, connection group 30 may comprise an electrically isolating element 36, preferentially an electrically isolating sheet of electrically isolating material, disposed between at least portions of first and second connection elements 30*a*, 30*b*. In particular, isolating element 36 may allow to arrange first and second connection elements 30*a*, 30*b* in close proximity to each other.

Moreover, each groove 33 may be provided between the respective first and second pairs of induction bars 34*a*, 34*b*, 35*a* and 35*b*.

As operation of packaging machine 1 is similar independently on whether induction sealing devices 20 comprises induction coil 22 or induction coil 22', we refer to the above-provided description with regard to operation of packaging machine 1 when having induction sealing devices 20 having induction coil 22'.

According to another aspect of the invention, there is also disclosed a method for manufacturing at least one multilayer rod 24.

In further detail, the method comprises at least the steps of:

- providing a metal plate, preferentially a silver plate, and a nickel alloy plate, preferentially a nickel-molybdenum-chromium alloy plate, preferentially having the above-disclosed properties; and
- brazing the metal plate, preferentially the silver plate, and the nickel alloy plate, preferentially the nickel-molybdenum-chromium alloy plate, to one another for obtaining a multilayer plate.

Preferentially, the step of brazing is executed after the step of providing.

Additionally, the method may comprise the step of placing the metal plate and the nickel alloy plate on top of one another. Preferentially, the step of placing may be executed after the step of providing and before the step of brazing.

Furthermore, the method may comprise the step of cutting, during which the multilayer plate is cut to obtain one or more multilayer rods 24. Preferentially, the step of cutting is repeated so as to obtain a plurality of multilayer rods 24.

According to a further aspect of the invention, there is also disclosed a method for manufacturing at least one induction sealing device 19 having induction coil 22 or induction coil 22'.

In further detail, the method comprises at least the steps of:

- forming, during which multilayer rod 24 is formed into induction coil 22 or 22'; and
- encapsulating, during which induction coil 22 or 22' is encapsulated and/or arranged within housing 21.

Preferentially, the step of encapsulating may be executed after the step of forming.

In more detail, the step of forming may comprise the sub-steps of:

- bending, during which at least one multilayer rod 24 is bent into induction coil 22, preferentially at least forming induction bar 22*a*, induction bar 22*b* and curved portion 22*c* of induction coil 22; and
- soldering, during which connecting group 30 is soldered to induction coil 22.

In the case of induction coil 22', the step of forming induction coil 22' may comprise the sub-step of bending, during which a first multilayer rod 24 is bent so as to at least preferentially form induction bars 34*a*, 34*b* and curved portions 34*c*, 34*d* and a second multilayer rod 24 is bent so as to at least preferentially form induction bars 35*a*, 35*b* and curved portion 35*c*.

Additionally, the step of forming induction coil 22' may comprise the sub-step of joining curved portion 34*d* to induction bar 35*b*.

Preferentially, the step of joining is executed after the step of providing.

In further detail, during the step of soldering, first connection element 30*a* and second connection element 30*b* are soldered to first induction bar 22*a* and second induction bar 22*b*, respectively, of induction coil 22 or induction bar 34*a* and induction bar 35*a*, respectively, of induction coil 22'.

Preferentially, the step of soldering is executed after the step of bending.

The step of encapsulating may comprise the sub-steps of:

arranging, during which induction coil 22 or induction coil 22' is arranged within a mould having and/or defining the shape of at least housing 21; and injecting, during which a molten polymer is injected into the mould in order that metal layer 25 of induction coil 22 or induction coil 22' is fully immersed in the molten polymer and that at least a remainder portion of corrosion resistant layer 26 is not immersed in the molten polymer.

Additionally, the method may comprise the steps of:

cooling the molten polymer; and ejecting the solidified molten polymer partially encapsulating induction coil 22 or induction coil 22' from the mould.

Preferentially, the step of ejecting may be executed after the step of cooling.

The advantages of package machine 1 and/or packaging forming apparatus 7 and/or sealing unit 18 and/or induction coil 22 and/or induction coil 22' and/or multilayer rod 24 according to the present invention will be clear from the foregoing description.

In particular, the use of the nickel alloy, preferentially the nickel-molybdenum-chromium alloy provides for a high corrosion resistance at reduced costs.

Additionally, this allows to provide for induction coils 22 or induction coils 22' having the needed corrosion-resistance at reduced costs.

Moreover, the method of manufacturing allows to easily and cost-efficiently obtain multilayer rods 24 and/or induction coils 22 and/or induction coils 22'.

Clearly, changes may be made to package machine 1 and/or packaging forming apparatus 7 and/or sealing unit 18 and/or multilayer rod 24 as described herein without, however, departing from the scope of protection as defined in the accompanying claims.

The invention claimed is:

1. A multilayer rod for an induction coil of a sealing unit, the multilayer rod comprising a metal layer and a corrosion-resistant layer;

wherein the corrosion-resistant layer comprises a nickel alloy;

wherein the nickel alloy comprises nickel, chromium, and molybdenum.

2. The multilayer rod according to claim 1, wherein the nickel alloy comprises at least 40% by weight of nickel and less than 60% by weight of nickel.

3. The multilayer rod according to claim 1, wherein the nickel alloy comprises at least 10% by weight of molybdenum and less than 20% by weight of molybdenum.

4. The multilayer rod according to claim 1, wherein the nickel alloy comprises at least 10% by weight of chromium and less than 20% by weight of chromium.

5. The multilayer rod according to claim 1, wherein the nickel alloy comprises at least 2% by weight of iron and less than 8% by weight of iron and 2% by weight of tungsten and less than 8% by weight of tungsten.

6. The multilayer rod according to claim 1, wherein the nickel alloy further comprises iron, tungsten.

7. The multilayer rod according to claim 6, wherein the nickel alloy comprises:

at least 40% and less than 60% by weight of nickel;

at least 10% and less than 20% by weight of molybdenum;

at least 10% and less than 20% by weight of chromium;

at least 2% and less than 8% by weight of iron;

at least 2% and less than 8% by weight of tungsten.

8. The multilayer rod according to claim 1, wherein the corrosion-resistant layer comprises a connecting surface and the metal layer comprises an attachment surface; wherein the connecting surface is arranged on the attachment surface and the connecting surface and the attachment surface are brazed to one another.

9. The multilayer rod according to claim 1, wherein the metal layer comprises silver.

10. A sealing unit for sealing a multilayer packaging material comprising an induction sealing device configured to generate an electromagnetic field, wherein the induction sealing device comprises at least an induction coil comprising or formed from a multilayer rod according to claim 1.

11. The sealing unit according to claim 10, wherein the sealing unit comprises a housing, wherein the induction coil is at least partially arranged within and encapsulated in the housing; wherein the induction coil comprises an outer portion, protruding away from the housing and defining at least partially an outer surface of the sealing unit; the outer portion being defined by at least a section of the corrosion-resistant layer and being configured to be exposed to an external corrosive environment, wherein the sealing unit comprises a powering group connected to a first end and a second end of the induction coil and configured to apply an alternating current to the induction coil.

12. A package forming apparatus for a packaging machine and being configured to at least transversally seal a tube formed from a multilayer packaging material for obtaining packages, the package forming apparatus comprising a sealing unit according to claim 10 configured to transversally seal the tube and comprising an induction sealing device.

13. A packaging machine for forming packages of a pourable product from an advancing tube formed from a web of multilayer packaging material, the packaging machine comprises:

a conveying device configured to advance the web of multilayer packaging material along a web advancement path and for advancing the tube along a tube advancement path;

a tube forming and sealing device configured to form the tube from the web of multilayer packaging material and to longitudinally seal the tube;

a filling device for filling the tube with the pourable product; and a package forming apparatus according to claim 12.

14. A method for manufacturing a multilayer rod for a sealing unit according to claim 1, the method comprising the steps of:

providing a metal plate and a nickel alloy plate;

brazing the metal plate and the nickel alloy plate to one another for obtaining a multilayer plate; and cutting the multilayer plate so as to obtain at least one multilayer rod.

15. A method for manufacturing an induction sealing device comprising at least one induction coil comprising and/or formed from a multilayer rod according to claim 1, the method comprising the steps of:

arranging the induction coil within a mould;

injecting a molten polymer into the mould such that the metal layer of the induction coil is fully immersed in the molten polymer and that at least a remainder portion of the corrosion resistant layer is not immersed in the molten polymer.

* * * * *